United States Patent
Cottis et al.

[11] 3,884,876
[45] May 20, 1975

[54] PARTIALLY CROSSLINKED LINEAR AROMATIC POLYESTERS

[75] Inventors: Steve G. Cottis, Amherst; James Economy, Eggertsville; Arnold A. Wosilait, Grand Island, all of N.Y.

[73] Assignee: The Carborundum Company, Niagara Falls, N.Y.

[22] Filed: Aug. 31, 1973

[21] Appl. No.: 393,705

[52] U.S. Cl............. 260/47 C; 117/132 C; 264/319
[51] Int. Cl............................................. C08g 17/02
[58] Field of Search.................... 260/47 C; 264/319

[56] References Cited
UNITED STATES PATENTS

| | | | |
|---|---|---|---|
| 3,637,595 | 1/1972 | Cottis et al. | 260/47 C |
| 3,662,052 | 5/1972 | Nowak et al. | 264/119 |
| 3,759,870 | 9/1973 | Economy et al. | 260/47 C |

Primary Examiner—Lester L. Lee
Attorney, Agent, or Firm—David E. Dougherty; Herbert W. Mylius; Raymond W. Green

[57] ABSTRACT

Partially crosslinked thermoplastic polyesters of recurring linear moieties of the formula

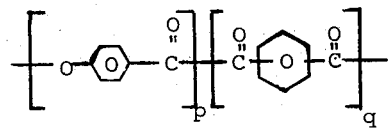

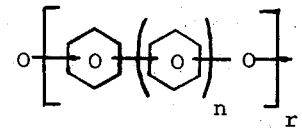

are described wherein $n$ is 0 or 1, and $p$, $q$ and $r$ are integers which total 30 to 600. The polyester is partially crosslinked by oxidizing meltable polymer to a "gelled" thermoplastic state, producing molecules of average molecular weights in the range of 10,000 to 1,000,000, preferably of 100,000 to 500,000.

13 Claims, No Drawings

PARTIALLY CROSSLINKED LINEAR AROMATIC POLYESTERS

The present invention relates to moldable thermoplastic aromatic linear polyesters and more particularly, to meltable copolyesters of aromatic diacids, bisphenols and hydroxybenzoic acids or compounds from which these reactants may result, which have been partially crosslinked so that they can't be drawn to fibers but are in a thermoplastic moldable state. It also relates to a process for producing such polymers.

In recent years considerable interest has been shown in various classes of wholly aromatic polyesters. Certain of these polyesters, particularly the homopolyesters of para-oxybenzoyl, have highly desirable properties of insolubility and high temperature infusibility. The inability to melt the homopolyester and its insolubility limit somewhat the means by which it can be molded, cast, shaped or processed into useful items. Therefore, it has been attempted to produce a moldable high temperature polyester which has desired heat stability and insolubility, for use in making molded items, pressed films, coatings, extrusions and other forms of the plastic.

Accordingly, it is an object of the present invention to provide an aromatic polyester which can be formed into molded items, pressed films, coatings, extrusions and other formed products.

It is a further object of the invention to provide an aromatic polyester which is partially crosslinked but retains thermoplasticity and thus can be readily molded into desired shapes.

Another object of the invention is to provide polyesters which are heat resistant but have softening points in the range of 200° to 425° centigrade.

Another object is to produce polyesters from para-functionalized aromatic moieties such as para-oxybenzoyl, paradicarboxyl phenyl and para-dioxy phenyl, preferably a copolyester thereof, and suitable ortho or meta isomeric forms.

Yet another object is to provide a method for making such partially crosslinked polymers.

These and other objects of the invention will become apparent from the description which follows.

In accordance with the invention, there is provided a partially crosslinked polyester of recurring linear moieties of the formula

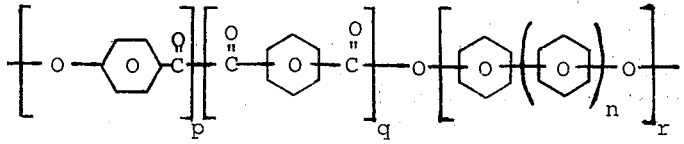

wherein $n$ is 0 or 1, and $p$, $q$ and $r$ are integers which total 30 to 600. Said polyester is crosslinked between crosslinking-susceptible moieties in the polymer chain and adjacent similar chains, with the extent of such crosslinking being limited so as to retain thermoplasticity in the polymer. The partially crosslinked polymer of the above-noted formula is produced by heating the above-described polyester in the presence of oxygen until a polymer of desired properties is formed.

The partially crosslinked polymer of the present invention has a softening point which permits easy molding and fabrication to desired shapes and forms. Molded articles of this polymer are tough and have excellent thermal shock resistance due to the partial crosslinking. Such thermal shock resistant properties have particular utility in molded structures which undergo exposures to extreme temperatures or are to be employed in contacts with electrical circuitry or heated elements or in similar end usages which subject the molded article to thermal shocks, especially repeated thermal shocks.

The polymers of the present invention utilize as reactants or constituents: (1) the oxybenzoyl moiety, which may be para, meta or mixtures but is preferably para or mixed meta-para; (2) aromatic diacids; and (3) bisphenols or dihydroxybenzenes. The para and meta functionalized nuclei are useful but the para is much preferred for the bisphenols or dihydroxybenzenes, while meta and mixed meta and para are preferred for the dicarboxylic acids. The polymers made have melting or softening points, whereas the homopolyester of para-oxybenzoyl is normally infusible. The heat stabilities of the polymers are very good, apparently attributable to the aromatic structure.

Referring more particularly to the polyesters of the above-described formula, the polymers can be random, block or highly ordered copolymers and the formula given is meant to illustrate this, rather than particular configurations. While the reactants composing the described polyesters can be varied widely, desirable high molecular weights are not achieved unless the molar ratio of the carboxyl to hydroxyl contents in reactants is within certain limits. Of course this ratio should be about 1:1 so as to permit linear polymer growth. Preferably, it is exactly 1:1. The ratio of the moieties shown by $q:r$, is usually maintained between 10:15 and 15:10, preferably between 10:11 and 11:10 and most preferably is 10:10. The "p" moiety can be present in more widely varying molar ratios but is generally preferred in molar ratios of $p:q$ and $p:r$ of 1:100 to 100:1 and more preferably 10:100 to 100:10. Most preferably, the ratio is from 1:1 to 10:1. However, $p$ may also be zero.

The copolyesters described exhibit softening or melting points prior to partially crosslinking which are lower than those of the para-oxybenzoyl homopolyesters. After crosslinking, the polymers of this invention do not have true melting points but rather, soften under pressure, exhibiting thermoplastic behavior.

In a preferred embodiment of the present invention, wherein $n$ is equal to 0 and both the carbonyl groups and the oxy groups are para to each other, the polyester comprises one of the recurring moieties which may be represented by the formula

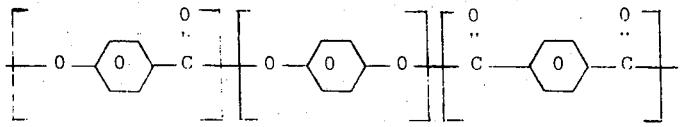

The introduction of ortho or meta-phenylene radicals into the backbone of the polyester results in a copolyester having a lower softening or melting point. In general the ratio of meta-phenylene radicals to para-phenylene radicals in the polyester is less than 10:1. It is preferably 1:2 to 10:1.

The polyesters useful in this invention can have widely varying molecular weights, from 500 to 72,000 or more, but those are generally between 2,000 and 25,000, preferably 3,500 to 20,000. Therefore, the sum of $p$, $q$ and $r$ is generally 30 to 600 and more usually is 30 to 200.

The polyester reactant of the invention can be synthesized by a wide variety of processes. In general, known methods for making high molecular weight p-oxybenzoyl homopolyesters can be employed. Usually, a p-oxybenzoyl compound or a source thereof, such as p-hydroxybenzoic acid, the phenyl ester thereof or acetoxy benzoic acid is reacted with an aromatic dicaboxylic compound such as terephthalic or isophthalic acid and/or with an aromatic dihydroxy compound such as a dihydroxybenzene or bisphenol in the molar proportions described. The sequence of reactions, reactant additions, reaction conditions, etc., controls the order of the polymer produced. Therefore, it is often desirable to first react certain of the reactants prior to the addition of different reactants to obtain a particularly desired polymer. For example, terephthalic acid may be reacted with hydroquinone in about equimolar proportions to produce a polymer to which p-hydroxybenzoic acid is later added, or all the reactants may be mixed together so that the reaction produces a more randomly distributed polymer rather than a "block" or otherwise ordered copolymer.

Examples of suitable reactants which serve as sources of p-oxybenzoyl include, among others, p-hydroxybenzoic acid, phenyl-p-hydroxybenzoate, p-acetoxybenzoic acid and isobutyl-p-acetoxybenzoate. Examples of suitable dicarboxylic compounds include, among others, terephthalic acid, isophthalic acid, diphenyl terephthalate, diethyl isophthalate, methylethyl terephthalate, and the isobutyl half ester of terephthalic acid. Examples of suitable dihydroxy compounds include, among others, hydroquinone, resorcinol, diacetoxy resorcinol, p,p'-bisphenol and p,p'-oxybisphenol. Hydroquinone is preferred because of cost, availability and reactivity.

According to a preferred process for producing the preferred heat resistant polyesters of the present invention p-hydroxybenzoic acid is reacted with an aromatic dicarbonyl compound in the presence of a monoester of the formula:

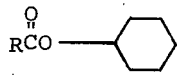

to produce a triester of the formula:

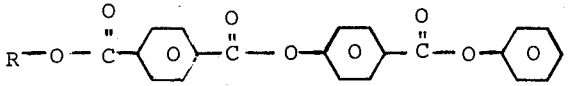

wherein R is hydrogen, phenyl or preferably, lower alkyl of 1 to 4 carbon atoms, preferably methyl. This triester is then reacted with a dihydroxybenzene or bisphenol wherein the hydroxyl groups are meta or para to each other, to produce the corresponding polyester.

Examples of suitable monoesters include, among others, phenyl benzoate, phenyl propionate, and most preferably, phenyl acetate.

The p-hydroxybenzoic acid can be mixed with the dicarboxylic compound and the monester at any temperature which will result in a reaction but generally such reaction takes place at about 50° to 220°C. and preferably at about 160° to 200°C. At lower temperatures the reaction proceeds slowly whereas at higher temperatures the p-hydroxybenzoic acid may tend to undergo an undesirable decarboxylation reaction. Subatmospheric pressures and pressures greater than atmospheric can be employed, e.g., from 0.1 to 50 atmospheres, but atmospheric pressure is preferred for the reactions. Catalysts are not necessary but can be used to increase the rates of reactions. The preferred catalysts are gaseous acid catalysts such as Lewis acids, but the hydrogen halides are most preferred, especially HCl.

The final condensation reaction, e.g., that of the triester with the dihydroxy benzene or bisphenol type compounds can be conducted at a suitable temperature, such as about 200° to 400°C., preferably at about 250° to 350°C. At lower temperatures the reaction proceeds too slowly whereas at higher temperatures the polyester may tend to degrade. Higher molecular weight favors thermal stability and therefore the reaction temperature is preferably raised stepwise within the above ranges as molecular weight increases. Although the condensation reaction can be conducted without the use of any catalyst, it is sometimes preferable to carry it out in the presence of a catalytic amount of a suitable condensation catalyst. Any of a number of known transesterification catalysts can be employed, examples of which include, among others, sodium alkoxides; titanium alkoxides, such as tetra-n-butyl orthotitanate; sodium titanium alkoxides; lithium hydroxide; and p-toluenesulfonic acid.

The above described reactions can be conducted in the melt phase but may also be conducted in the presence of a liquid heat transfer medium having a high boiling point. Examples of suitable heat transfer media include, among others, the terphenyls; a eutectic mixutre of 73.5% diphenyl oxide and 26.5% diphenyl, commercially available under the trademark Dowtherm A; mixtures of various polychlorinated polyphenyls such as chlorinated bisphenyls typified by those commercially available under the trademark Therminol FR; and polyaromatic ethers and mixtures thereof such as those composed of mixtures of meta and para isomers, having boiling ranges in excess of 400°C, typical representatives of which are available commercially under the trademark Therminol 77, which are described in U.S. Pat. No. 3,406,207.

The term "lower", when used with terms such as lower alkyl and lower alkoxy refers to a content of one to six carbon atoms, preferably 1 to 4 carbon atoms and usually most preferably, 1 to 2 carbon atoms. The phenylene radicals are preferably unsubstituted but can have one to three substituents which do not materially alter the physical and chemical characteristics of these useful polyesters. Examples of suitable substituents include, among others, halogens, such as clorine, fluorine or bromine; lower alkyl such as methyl, ethyl or isopropyl; and lower alkoxy such as ethoxy.

The above reactions and examples of the production of suitable polyesters to be partially crosslinked to the product of the present invention are described in U.S. Pat. No. 3,637,595, the disclosure of which is incorporated herein by reference.

On completion of the polymerization to a higher polymer the polymer is subjected to the treatment of the processes of this invention for a period of time sufficient to transform it to a condition where a fiber can't be formed by drawing and a film can't be deposited. Such a condition is sometimes referred to as a gel and the point where the extent of polymerization is such as to prevent fiber and film formation is sometimes called the gel point. Oxidative crosslinking is terminated at about this point so as to retain thermoplasticity. The oxidative crosslinking (which tests indicate is related to oxidation and oxygen links) may be catalytically aided by conventional oxidation catalysts or may be effected solely by bubbling or passing oxygen, air or other oxygen-containing gas through a melt of the copolyester or other polymer of this invention or into contact with such polymer at an elevated temperature. The polymer can be "oxidized" by prolonged exposure to air, while being held in the molten state or equivalent treatments with a source of oxygen and heat may be used. However, the passage of air or oxygen across the surface of a stirred melt or by bubbling the gas through the melt increases the speed of the "oxidative crosslinking". Crosslinking or oxidation temperatures are usually from 250°C. to 500°C. and times are normally from 10 minutes to 10 hours. The oxidizing gas will generally contain 5 to 100% of oxygen. On cooling the "gelled" polymer becomes a tough solid which can be reheated and softened for molding.

While the polymer can be crosslinked in the polymerization equipment, it has been found that particularly good results are obtained utilizing mixing equipment in which the melt of copolymer is vigorously mixed, preferably with distributing, kneading, wall scraping and homogenizing elements to intimately mix the air and polymer. The mixers have heating and control means therein to control the temperature so the linear polymer is kept in a softened or molten state. Cycling times of such apparatus can be controlled so as to retain the polymer in a heated state exposed to air for predetermined lengths of time while mixing and working the polymer. In the utilization of such equipment to effect partial crosslinking of the described polymer in accordance with the present invention, the polymer can be recycled through the equipment a plurality of times, if desired.

Instead of oxidative crosslinking from a melt, milling at elevated temperature may also be used and so may be heating in powdered form in the presence of air. The former method is especially useful because the polymer changes appearance and properties as crosslinking occurs, becoming powdered and nonadherent, signalling the completion of the desired crosslinking. The powder heating method (which can also be applied to films or more continuous forms of the starting material) is a very simple method, requiring minimal equipment and yielding a good product.

The number of actual crosslinks between polymer chains will vary with the particular polyester structure, the number of susceptible positions on the polymer chains, the time and temperature at which the linking reaction is carried out and other considerations. The total amount of crosslinking effected is limited, being low enough to retain thermoplasticity but great enough to improve the polymer's physical properties.

The crosslinkings effected between chains of the substantially linear polymers by the invented processes have herein been described as oxidative, oxidatively caused or oxygen crosslinks. Analyses of the crosslinked products made show an increased percentage of oxygen present therein compared to the linear reactant polymers. However, the exact locations of the bonds have not been positively established. Although it is considered that the crosslinked bonds are through an etheric oxygen to nuclear carbons of the benzene rings, linkages may also be through an initially carbonyl oxygen to an oxygen added to a nuclear carbon or from nuclear carbon. Other types of linkings, as between an initially carbonyl oxygen of the linear polymer and a benzene ring of another linear polymer, are also possible. Still other crosslink mechanisms may be the means of joining linear polymer chains to produce the present moldable polymer. Generally, electron-rich nuclei are more susceptible to crosslinking. For example, the order of "susceptibility" is hydroquinone > bisphenol > oxybenzoyl > diacids. In this specification the polymerization mechanism is referred to as oxidative crosslinking but it is to be understood that such terminology is meant to describe the polymerization methods employed and the products obtained by the present method, whatever the exact nature of the mechanisms or structures.

The polyesters of the present invention have a wide range of utility and can be used to prepare extrusions, pressed films, molded items and coatings having excellent high temperature properties. They may be used as bonding agents for abrasive products and can be compression molded, injection molded and extruded, employing conventional techniques, to produce articles having exceptionally high flexural strength values. Their processing properties are like those of a thermoplastic. They are also useful to provide substrates, such as those of iron or steel and other metals, with heat resistant protective coatings and in uses which require high resistance to thermal shock.

In addition to the crosslinking of the copolyesters the heat plus oxygen treatment thereof also promotes further chain propagation, which improves the various product characteristics mentioned without destroying moldability.

It has been observed that material heated in a rotary oven to 365°C cannot be compression molded into shapes with a retained strength. Furthermore, such material may be extruded to produce fibers, thus indicating that the gel point of the material has not been exceeded.

The invention will be further illustrated by the following examples which are illustrative of certain preferred embodiments thereof. Unless otherwise indicated, all temperatures are in °C and all parts and percentages are by weight.

EXAMPLE 1

An oxybenzoyl polyester of the "empirical" formula

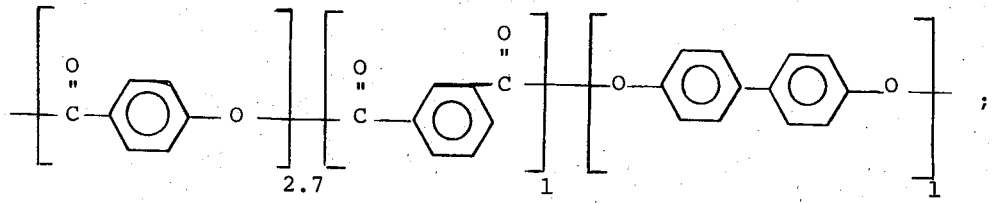

is prepared by reacting 2.7 moles of para-hydroxybenzoic acid with 1 mole of iso-phthalic acid by mixing the ingredients together and heating to 180°C. HCl is bubbled through the reaction mixture and heating is continued for 6 hours. The temperature is then raised to 200°C. with stirring continuing for an additional 2 hours. At this point, the HCl flow is terminated and 1 mole of p,p'-bisphenol is introduced. Polymerization is continued by stirring the mixture at 280°C. for one hour, followed by an increase in temperature to 300°–310°C. and holding for 2 hours. At this point a diluting amount of Therminol 77 is added as a dispersant for the reaction mixture. Stirring and heating are continued for 5 hours at 320°C.

The mixture is then cooled, the Therminol is separated from the solids and the solid portion is washed with acetone. The solid product is then dried at 110°C. under reduced pressure to yield a polymer in finely divided form. This polymer has a melting point of 300°C.

The formed oxybenzoyl copolyester is then heated to 332°C. in air and is subjected to intensive mixing with high shearing so that it is intimately contacted by air during the heating and mixing, for 45 minutes until it has passed the "gel point", evidenced by a noticeable change in viscosity, indicative of partial crosslinking.

This partially crosslinked polymer is suitable for compression molding and extrusion into thermally shock resistant molded articles and such are produced from it by conventional compression and injection molding methods.

EXAMPLE 2

A second portion of the linear polyoxybenzoyl copolyester of Example 1 is heated to 400°C. and air is blown through the polymer for 30 minutes, while it is being intensively mixed, until the "gelation point" is passed. The gelled partially crosslinked polymer is then compression molded, using a metal mold heated to a temperature of 371°C. The mold is preheated for at least 30 minutes prior to the compression molding step to insure a full residue of heat capacity. The polymer is then placed in the mold and is compression molded at 5,000 lbs./sq. in., with a dwell time of 15 to 20 minutes. The mold and polymer therein are then allowed to cool to 150°C. and the molded article is removed from the mold. The procedure is repeated nine times.

The flexural strength of the molded specimens is then evaluated. Based on the ten test specimens, the average results obtained are F (flexural strength) = 11,493 lbs./sq. in.; E (flexural modulus) = 560,000 lbs./sq. in.; and Strain = 3.2%.

EXAMPLE 3

A linear copolyester of the formula

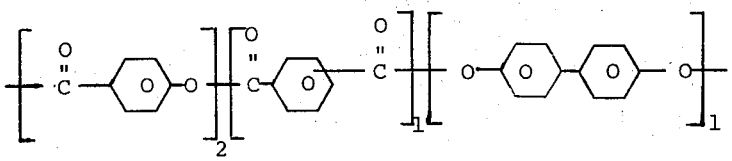

is produced in accordance with Example 1. The resulting polymer is heated to 343°C. with mixing in contact with air until the polymer is no longer capable of being drawn or melt spun to a fiber. The polymer is then heated to 385°C. and is repeatedly contacted with air, the total heating time above its melting point being thirty minutes.

The resulting partially crosslinked polymer is compression molded at a mold temperature of 330°C. and a pressure of 6,000 lbs./sq. in. Molded articles of this polymer exhibit excellent thermal shock properties.

EXAMPLE 4

276 Parts of para-hydroxybenzoic acid, 340 parts of phenyl acetate and 636 parts of diphenyl isophthalate are heated under a nitrogen atmosphere, with stirring, until the temperature reaches 180°C., at which point 3.5 parts of hydrochloric acid are added. Heating is continued with reflux, while taking off a total of about 239 parts of distillate (principally acetic acid) for a period of 4 hours, after which 372 parts of p,p'-bisphenol are then added and the temperature is raised to 360°C. gradually, with stirring, over a period of 13 hours, with the temperatures for the last 3 hours being over 300°C. Additional distillate taken off totals 502 parts.

The product is dumped, cooled to room temperature and is ground to particle sizes in the range of 6 to 140 mesh, U.S. Standard Sieve Series. Analysis confirms that the polyester contains equimolar proportions of moieties derived from the parahydroxybenzoic acid, diphenyl isophthalate (isophthalic acid) and p,p'-bisphenol.

The polymer is partially crosslinked and chain extended so as to make a product which is no longer capable of being drawn into a fiber or deposited as a film but is still fusible and moldable by milling on a two roll mill at elevated temperatures. At a temperature of 400°C. the polymer is passed three times between the rolls of a two-roll mill. For the first pass the mill setting is at 0.03 centimeter and the 871 parts of product that were made are fed through the mill in about 15 minutes. During the milling the polymer melts and the product coming off the mill appears fibrous. The second pass through the mill produces a solid product and takes about eight minutes, using a larger opening (about 0.05 cm.). The third pass produces flakes, using the same opening and about five minutes of milling.

The products made are further size reduced to be in the 8 to 100 mesh range and are subsequently molded at 6,000 lbs./sq. in. at 330°C. for 5 minutes. The mold is allowed to cool to about 150°C., and the molded article is removed. The process is repeated nine more times and the ten molded specimens made are tested for physical properties. The average flexural strength is found to be 11,722 lbs./sq. in. and the flexural modulus averages 330,000 lbs./sq. in., at a strain of 5%. At a strain of 5.36%, the figures are 12,300 and 355,000, respectively.

When the production method and curing are repeated, with curing being effected by heating 100 mesh particles of the polymer in air in trays for 10 hours, the cured polymer made and subsequently molded by the method of Example 3 is of essentially the same properties. The curing period can be accelerated by raising the temperature of the product to 350°C, while maintaining the polymer in particulate form. In other variations of the curing operation the polymer is raised to 400°C, at which temperature it is molten, and air is blown through it for about one hour, after which the cure is about to the same extent as previously described and the properties of the product are about the same.

EXAMPLE 5

138 parts of para-hydroxybenzoic acid, 186 parts of p,p'-bisphenol, 166 parts of isophthalic acid, 325 parts of acetic anhydride and 1,000 parts of a partially hydrogenated terphenyl commercially available under the trademark Therminol 66 are heated under a nitrogen atmosphere to a temperature of 300°C at the rate of about 30°C per hour. Until the temperature reaches 180°C a condenser is utilized, after which it is replaced by a distilling head, with stirring at about 140 r.p.m. being continued. A total of 376 parts of distillate is removed, washed with acetone to extract the Therminol 66, cooled to room temperature and vacuum dried to remove the acetone. The product is hammer milled through a 20 mesh screen and is then cured.

The curing operation is effected by heating 200 parts at 300°C. in static air for three hours and then screening through a 20 mesh screen. A weight loss of 9.5 parts is experienced. Then the cure continues for 1 hour at 330°C. with screening through the 20 mesh sieve following. The weight loss is one part. Next the curing temperature is raised to 360°C. and held there for 1 hour, with a weight loss of three parts, after which similar screening is effected. Finally, the powder is held at 360°C. for an additional hour, with the weight loss of four parts, and is screened through a 20 mesh sieve.

The product resulting is compression molded at 332°C. and 6,000 lbs./sq. in., for 10 minutes. When tested for flexural strength, modulus and strain, the properties are found to be like those of the similar 1:1:1 copolyesters of Example 4.

EXAMPLE 6

In a reaction vessel 89 parts of para-hydroxybenzoic acid, 213 parts of isophthalic acid, 239 parts of p,p'-bisphenol, 359 parts of acetic anhydride and 1,000 parts of Therminol 66 are refluxed one hour at 155°C., after which the temperature is raised to 250°C. and held there for 1½ hours, then raised to 300°C. for a 4 hour period and held at that temperature for an additional hour, to produce a copolyester. The product is cooled to 320°C., dumped and centrifuged, after which it is washed with trichloroethylene to remove the Therminol 66 and the trichloroethylene is evaporated off. The powder is size-reduced to particles that will pass a 100 mesh sieve and is cured by blowing air across the surface thereof until the molecular weight is substantially increased at which stage the product is still extrudable although less capable of being drawn to a fine fiber or deposited as a thin film. The yield is 82.9% for the "ungelled" polymer and 75% for the molding powder.

When molded at a pressure of 12,000 lbs./sq. in. at a temperature of 370°C for 15 minutes, the product made, tested at room temperature, has a flexural strength of 17,900 lbs./sq. in., a flexural modulus of 920,000 lbs./sq. in. and a strain of 2.3%. The molded items made are useful as electrical part substrates for subjection to high temperatures, potting compounds and for general high quality engineering plastic uses in high temperature applications. A similar product is obtainable when hydroquinone or a 3:7 mixture of resorcinol and hydroquinone is substituted for the p,p'-bisphenol in equimolar proportions.

In the foregoing examples and in the procedures described in the specification the various conditions employed may be adjusted, depending on the characteristics of the polymer employed. A typical copolyester of isophthalic acid, para-hydroxybenzoic acid and p,p'-bisphenol of a 1:1:1 molar ratio has a melting point of 335°C and a softening point of 240°C whereas when the ratio is changed to 2:1:2 these become 399°C and 316°C, respectively. An intermediate formulation, of a 3:2:3 composition has a melting point of 372°C and a softening point of 274°C. Comparatively, para-hydroxybenzoic homopolymer has an estimated softening point of about 600°C. The corresponding partially cured copolyesters also have different melting and softening points and consequently, the molding conditions may be varied, depending on the monomeric constituents employed and the extent of curing or crosslinking. Normally, molding will be at a temperature of 300° to 500°C., at a pressure of 1,000 to 100,000 lbs./sq. in., preferably from 3,000 to 20,000 lbs./sq. in., for from 30 seconds to 30 minutes, preferably from 2 to 20 minutes. After molding, cooling to aid mold release may be to room temperature but usually the temperature will be lowered, if at all, to a point intermediate room temperature and the molding temperature, e.g., from 100° to 300°C., preferably from 100° to 200°C. In a similar manner, various other manufacturing conditions may be modified to be more favorably adapted to the materials being processed.

While the invention has been described herein with references to certain examples of preferred embodiments, it is to be understood that various changes and modifications can be made by those skilled in the art without departing from the concept of the invention, the scope of which is determined by reference to the following claims.

What is claimed is:

1. A moldable partially crosslinked polyester containing recurring moieties of the formula

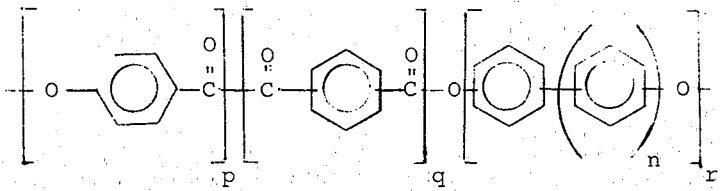

wherein $n$ is 0 or 1 and $p$, $q$ and $r$ are integers which total 30 to 600, wherein crosslinking is between susceptible moieties in the polymer chain and adjacent polymer chains of the same formula and is so limited as to make the crosslinked polymer produced thermoplastic and moldable while being sufficient to make it incapable of being melt drawn or spun to a fiber or deposited as a film, which crosslinking is that effected by heating a linear polyester of the formula given to an elevated temperature in the range of 250° to 500°C. in the presence of oxygen for a period of time long enough to make the polymer produced incapable of being fiber forming by drawing or spinning from a melt and incapable of being deposited as a film, while still retaining thermoplasticity and being moldable.

2. A polyester according to claim 1 wherein the molecular weight of the linear polyester prior to partial crosslinking is in the range of about 2,000 to 25,000, the molecular weight after crosslinking is in the range of about 100,000 to 500,000, the ratio of $q:r$ is between 10:15 and 15:10 and the ratios of $p:q$ and $p:r$ are between 1:100 and 100:1.

3. A polyester according to claim 2 wherein $n$ is 0, the oxygens of the dioxyphenyl moiety resulting are located para to each other and the carbonyls of the dicarbonyl phenyl moiety are para to each other or are in a mixture of meta- and para-carbonyl-substituted moieties.

4. A polyester according to claim 2 wherein $n$ is 1, the ratio of $q:r$ is about 1, the ratios of $p:q$ and $p:r$ are from 1:1 to 10:1, the oxygens of the bisphenol are located para to each other and the carbonyls of the dicarbonyl phenyl moiety are para to each other or are in a mixture of meta- and para-carbonyl-substituted moieties.

5. A molded polyester of claim 1.
6. A molded polyester of claim 3.
7. A molded polyester of claim 4.
8. A method of producing a partially crosslinked polyester according to claim 1 which comprises heating a linear polyester of the formula given in that claim to an elevated temperature in the range of 250° to 500°C. in the presence of oxygen for a period of time long enough to make the polymer produced incapable of being fiber forming by drawing or spinning from a melt and incapable of being deposited as a film, while still retaining thermoplasticity and being moldable.

9. A method according to claim 8 wherein the molecular weight of the linear polyester prior to partial crosslinking is in the range of about 2,000 to 25,000, the molecular weight after crosslinking is in the range of about 10,000 to 1,000,000, the ratio of $q:r$ is between 10:15 and 15:10 and the ratios of $p:q$ and $p:r$ are between 1:100 and 100:1.

10. A method according to claim 9 wherein the linear polyester so treated and the product resulting are those of claim 30.

11. A method according to claim 8 wherein the polyester being heated is in particulate form and the heating is to a temperature below its melting point.

12. A polyester according to claim 2 wherein $n$ is 1, the ratio of $q:r$, before crosslinking, is about 1, the ratio of $p:q$, before crosslinking is about 1:2, the ratio of $p:r$, before crosslinking, is about 1:2, the oxygens of the bisphenol are located para to each other and the carbonyls of the dicarbonyl phenyl moiety are located meta to each other.

13. A molded polyester of claim 12.

* * * * *